R. W. HOPE AND A. DEATHRIDGE.
CASEMENT FASTENER.
APPLICATION FILED OCT. 6, 1919.

1,334,610.

Patented Mar. 23, 1920.

INVENTORS
R.W. Hope
A. Deathridge
BY
H.R.Kerslake
ATTORNEY

UNITED STATES PATENT OFFICE.

RALPH WALTER HOPE AND ARTHUR DEATHRIDGE, OF BIRMINGHAM, ENGLAND.

CASEMENT-FASTENER.

1,334,610.  Specification of Letters Patent.  Patented Mar. 23, 1920.

Application filed October 6, 1919. Serial No. 328,953.

*To all whom it may concern:*

Be it known that we, RALPH WALTER HOPE and ARTHUR DEATHRIDGE, both subjects of the King of Great Britain and Ireland, and both residing at 55 Lionel street, Birmingham, in the county of Warwick, England, have invented certain new and useful Improvements in Casement - Fasteners, of which the following is a specification.

This invention has reference generally to that class of invention known as builders hardware and more particularly relates to an improvement casement fastener.

The invention has for its primary aim and object to provide a device of the above mentioned character wherein a pin of an improved construction is employed for rigid engagement with a plate adapted to be fastened to a casement, the pin being so shaped as to rotatably receive the handle of the fastener while a washer is employed to co-act with the pin for maintaining the handle in proper position.

Briefly stated the invention may be said to consist of a plate for attachment to the casement, a handle, a washer and the pin comprising a turned piece with four different diameters having a flange that serves the purpose of forming a bearing contact for the pin and a seat for the washer, an improved shaped end part riveted to the casement plate, a shank upon which the handle is rotatable and a shouldered portion of smaller diameter than the shank to receive the washer, the latter being held in position by riveting over the end of the pin.

The invention is clearly illustrated in the accompanying drawings, in which:—

Figure 1:
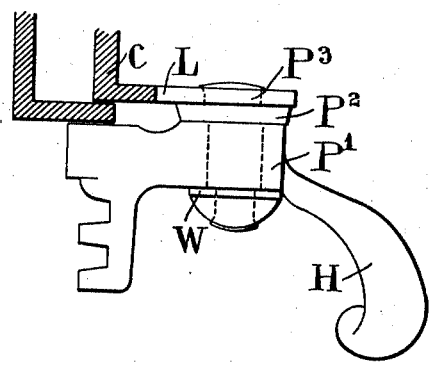
Figure 1 is a side elevation, partly in section showing the improved fastener with the several parts assembled in proper relation.
Figure 2:
Fig. 2 is a cross sectional view through the D-shaped portion of the pin.
Figure 3:
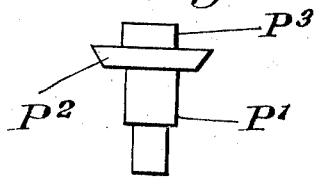
Fig. 3 is a side elevational view of the pin separated.

H is the handle of the casement fastener. The pivot pin comprises the shank $P'$, a flange $P^2$, and a rivet end $P^3$ which is so shaped as to be passed through a hole (preferably fluted or D-shaped) in the plate L, and then riveted over in contradistinction to merely being passed through a circular hole and riveted over, a means at present employed for securing the pin to the plate. The end of the pin projecting through the boss of the casement handle is reduced in diameter forming a shoulder for a washer W which is fastened after the handle is in position by riveting over the end of the pin. The plate L is welded to the casement frame C in the usual manner.

The flange on the pin gives a substantial shoulder for contact with the plate and also provides a seating of ample area for the under side of the boss of the handle.

Having now described our invention, what we claim as new and desire to secure by Letters Patent is:—

An improved casement fastener including in combination, a plate adapted to be welded to the casement and provided with a D-shaped opening, a fastening handle having a boss, a pin for permanently mounting the handle to the plate and a washer for embracing the pin, the pin having four different diameters consisting of a flange forming a shoulder for contact with the plate and also providing a seat for the boss of the handle, an end part D-shaped in cross section passed through the opening in the plate and riveted over the plate, a shank about which the handle is rotatable, and a shouldered portion of smaller diameter than the shank about which the washer is embraced preparatory to the riveting over of such end portion for insuring of the retention of the washer and handle in position.

In testimony whereof we have signed our names to this specification.

RALPH WALTER HOPE.
ARTHUR DEATHRIDGE.